United States Patent [19]
Eilingsfeld et al.

[11] 3,876,626
[45] Apr. 8, 1975

[54] MONOAZO COMPOUNDS CONTAINING A PHTHALIMIDE COMPONENT

[75] Inventors: Heinz Eilingsfeld, Frankenthal; Guenther Hansen; Ernst Schaffner, Ludwigshafen, all of Germany

[73] Assignee: Badische Anilin- & Soda-Fabrik Aktiengesellschaft, Ludwigshafen/Rhine, Germany

[22] Filed: Dec. 21, 1972

[21] Appl. No.: 317,154

[30] Foreign Application Priority Data
Dec. 23, 1971 Germany............................ 2164198

[52] U.S. Cl............................. 260/152; 260/326 N
[51] Int. Cl............................................ C09b 29/36
[58] Field of Search............................ 260/152, 165

[56] References Cited
UNITED STATES PATENTS
3,743,632   7/1973   Horstmann ........................ 260/152
FOREIGN PATENTS OR APPLICATIONS
1,358,145   3/1964   France ................................ 260/152
787,424   6/1968   Canada ................................ 260/152

Primary Examiner—Lorraine A. Weinberger
Assistant Examiner—C. F. Arren
Attorney, Agent, or Firm—Johnston, Keil, Thompson & Shurtleff

[57] ABSTRACT

Azo disperse dyes containing an N-substituted 3-amino-6-nitrophthalimide as diazo component and an aniline coupling component. The dyes give yellow to blue colorations particularly on polyesters; these colorations have good fastness properties.

The dyes may be represented by the formula:

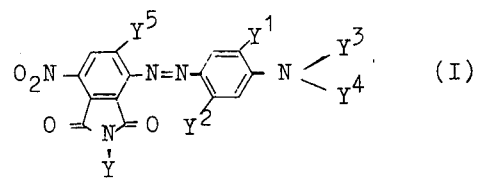

(I)

in which
Y is unsubstituted or substituted alkyl, cycloalkyl, aralkyl or aryl;
$Y^1$ is hydrogen, alkyl or alkoxy;
$Y^2$ is hydrogen, alkyl, alkoxy, halogen or unsubstituted or substituted acylamino;
$Y^3$ is hydrogen or unsubstituted or substituted alkyl, cycloalkyl, aralkyl or aryl;
$Y^4$ is unsubstituted or substituted alkyl; and
$Y^5$ is hydrogen, chlorine, bromine, nitro, methylsulfonyl, ethylsulfonyl or cyano.

1 Claim, No Drawings

MONOAZO COMPOUNDS CONTAINING A PHTHALIMIDE COMPONENT

The invention relates in particular to dyes of the formula (Ia):-

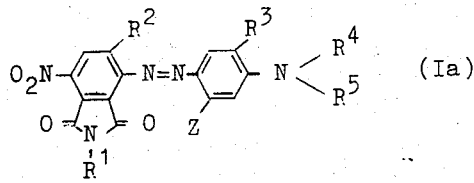

in which $R^1$ is alkyl of one to eight carbon atoms, hydroxyalkyl of two to eight carbon atoms, hydroxyaralkyl of a total of six to 11 carbon atoms, alkoxyalkyl of a total of three to 11 carbon atoms, polyalkoxyalkyl, hydroxy(poly)alkoxyalkyl, phenoxyalkyl of a total of up to 11 carbon atoms, carboalkoxyalkyl of a total of two to 15 carbon atoms, acyloxyalkyl of a total of up to 15 carbon atoms, phenyl, phenyl bearing hydroxy, chlorine, methyl, ethyl, β-hydroxyethyl, methoxy, ethoxy, β-hydroxyethoxy, cyano or dialkylamine as a substituent, cyclohexyl, benzyl, phenylethyl, phenylpropyl, phenylbutyl or ω-N-pyrrolidonalkyl of two to six carbon atoms in the alkyl radical;

$R^2$ is hydrogen, chlorine, bromine or cyano;

$R^3$ is hydrogen, methoxy or ethoxy;

$R^4$ is hydrogen, alkyl of one to four carbon atoms, hydroxyalkyl of two or three carbon atoms, alkoxyalkyl of three to seven carbon atoms, cyanoalkyl, alkanoyloxyalkyl of four to seven carbon atoms, carboalkoxyethyl of four to seven carbon atoms, chloroethyl, acetoacetoxyethyl, γ-acetylaminopropyl, cyclohexyl, benzyl, phenylethyl, phenyl, methoxyphenyl or ethoxyphenyl;

$R^5$ is alkyl of one to four carbon atoms, hydroxyalkyl of two or three carbon atoms or alkanoyloxyalkyl of three to seven carbon atoms; and Z is hydrogen, chlorine, methoxy, ethoxy, acetylamino, propionylamino or methyl.

Further examples of radicals $R^1$ are as follows:- the alkyl radicals methyl, ethyl, propyl, butyl, hexyl, β-ethylhexyl and allyl;

the hydroxyalkyl radicals β-hydroxyethyl, β-hydroxypropyl, γ-hydroxypropyl, ω-hydroxybutyl, ω-hydroxyhexyl and radicals of the formulae:-
$CH_2-CH_2-O-CH_2-CH_2-OH$,

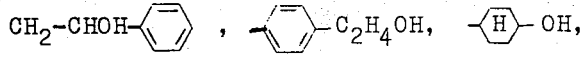

$(CH_2)_3-O-(CH_2)_4-OH$ and

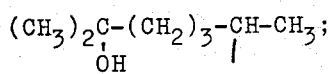

the alkoxyalkyl radicals β-methoxyethyl, γ-methoxypropyl, γ-ethoxyethyl, γ-ethoxypropyl, γ-isopropoxypropyl, γ-butoxypropyl or the radicals of the formulae:

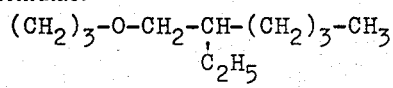

and
$(CH_2)_3-O-C_2H_4-O-CH_3$; the phenoxyalkyl radicals of the formulae:

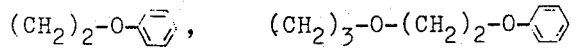

and 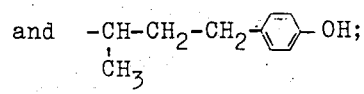

the carboxyalkyl and carbalkoxyalkyl radicals of the formulae:

$CH_2-COOR$, $CH_2-CH_2-COOR$, $(CH_2)_5-COOR$ and $(CH_2)_2-O-CO-(CH_2)_2-COOR$ in which R is for example hydrogen, methyl, ethyl, propyl, benzyl, β-hydroxyethyl, ω-hydroxyhexyl, δ-hydroxybutyl, β-methoxyethyl, γ-methoxypropyl, γ-ethoxypropyl, β-phenoxyethyl or β-hydroxyethoxyethyl;

the acyloxyalkyl radicals of the formulae:
$CH_2-CH_2-O-acyl$, $(CH_2)_3-O-acyl$,

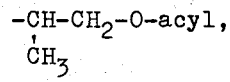

$(CH_2)_6-O-acyl$, $(CH_2)_2-O-(CH_2)_2-O-acyl$ and $(CH_2)_3-O-(CH_2)_4-O-acyl$ in which acyl is for example $CO-H$, $CO-CH_3$, $CO-C_2H_5$,

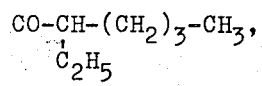

$CO-CH_2Cl$, $CO-CH_2-CO-CH_3$, $CO-CH=CH_2$,

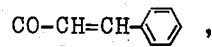

$CO-CH=CH-COOH$, $CO-(CH_2)_2-COOH$, $CO-(CH_2)_2-COOC_2H_5$,

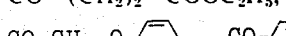

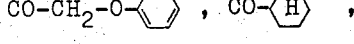

$COOC_2H_5$ or $CONH-$.

Examples of radicals $R^4$, in addition to those already mentioned, are methyl, ethyl, n-propyl, isopropyl, n-butyl, isobutyl, β-hydroxyethyl, β-hydroxypropyl, β,γ-dihydroxypropyl, γ-hydroxypropyl, methoxyethyl, ethoxyethyl, cyanoethyl, acetoxyethyl, acetoxypropyl, propionyloxyethyl, isopropionyloxyethyl, butyroxyethyl, isobutyroxyethyl, carbomethoxyethyl, carboethoxyethyl and carbobutoxyethyl. The same radicals are suitable for $R^5$ within the general definition given above.

The dyes of formula (I) may be prepared by reaction of an amine of the formula (II):-

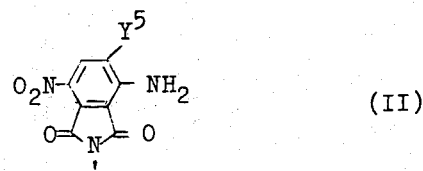

with a coupling component of the formula (III):-

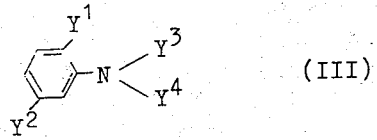

The 3-amino-6-nitro-N-substituted phthalimides of formula (II) can be prepared according to J. J. Reznikova, T. V. Veselova, Z. Org. Chim., 4, 840 (1970) (as shown therein using 3-amino-N-methylphthalimide as example) via the acetyl derivatives by nitration in nitric acid/sulfuric acid followed by elimination of the acetyl group in dilute hydrochloric acid:-

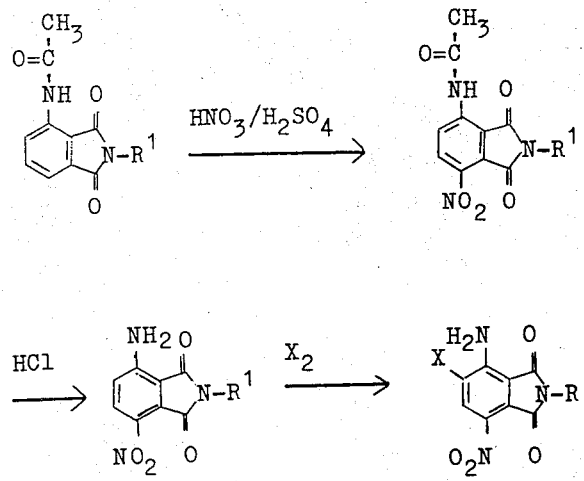

X = bromine or chlorine

The corresponding 3-amino-4-bromo-6-nitro and 3-amino-4-chloro-6-nitro N-substituted phthalimides are obtained therefrom by a conventional method by bromination or chlorination. N-substituted 3-amino-6-nitrophthalimides, 3-amino-4-bromo-6-nitrophthalimides or 3-amino-4-chloro-6-nitrophthalimides in which the imide radical is derived from a higher-boiling amine may also be prepared by amine exchange. For example the amine radicals in methylimides or ethylimides may be exchanged by heating with a less volatile amine, if necessary in a solvent.

Details of the production of the diazo components are to be found in the Examples.

Dyes in which $Y^5$ is cyano may be prepared by replacing the halogen in the corresponding dye of the formula (I) in which $Y^5$ is bromine by cyano by one of the methods known from the literature.

The radical $R^1$ may be derived for example from one of the following amines: allylamine, methylamine, ethylamine, n-propylamine, isopropylamine, n-butylamine, isobutylamine, tert-butylamine, isoamylamine, n-hexylamine, isohexylamine, n-octylamine, isooctylamine, β-ethylbutylamine, β-ethylhexylamine, cyclohexylamine, β-hydroxyethylamine, β-hydroxypropylamine, γ-hydroxypropylamine, ω-hydroxyhexylamine, β-methoxyethylamine, β-ethoxyethylamine, β-butoxyethylamine, γ-(β'-ethylhexoxy)-propylamine, β-(β'-hydroxyethoxy)-ethylamine, γ-(β'-phenoxyethoxy)-propylamine, γ-(δ-hydroxybutoxy)-propylamine, γ-ethoxypropylamine, γ-methoxypropylamine, γ-isopropoxypropylamine, β-amino-β-ethyl-α,γ-propanediol, β-methyl-β-aminopropanol, β-aminoethylthiomorpholine-S-dioxide, N-γ-aminopropylpyrrolidone, aniline, o-toluidine, m-toluidine, p-toluidine, o-methoxyaniline, m-methoxyaniline, p-methoxyaniline, o-chloroaniline, m-chloroaniline, p-chloroaniline, o-cyanoaniline, m-cyanoaniline, p-cyanoaniline, o-ethoxyaniline, m-ethoxyaniline, p-ethoxyaniline, o-ethylaniline, m-ethylaniline, p-ethylaniline, p-aminobenzoic methylamide, p-aminobenzoic β-methoxyethylamide, 4-(β-hydroxyethyl)-aniline, 4-(β-hydroxyethoxy)-aniline, benzylamine and β-phenylethylamine, or from aminoacetic acid, β-aminopropionic acid, ω-aminocaproic acid and esters thereof.

If the novel dyes of formula (I) contain an ester group in the radical $R^1$, the production of compounds of the formula (I) may be carried out in principle according to the abovementioned method if the appropriate ester group is already contained in the coupling component. In some cases it is convenient however to introduce the acid radical acyl into the finished dye of formula (I). The free acids, their anhydrides, chlorides or esters are suitable for this purpose and inert diluents or solvents such a monochlorobenzene, dichlorobenzene, trichlorobenzene, tetrahydrofuran, dioxane, dimethylformamide, N-methylpyrrolidone and pyridine may conveniently be added.

In the esterification with free acids it may be advantageous to add an inorganic or organic catalyst, for example hydrogen chloride gas or p-toluenesulfonic acid and to allow the water formed to evaporate from the reaction mixture. When an acid anhydride or acid chloride is used for the esterification, the acid in question may in special cases be used as solvent. For example, reaction with acetic acid may be carried out in acetic anhydride. When acid chlorides are used as esterifying agents, it is advantageous to add to the reaction mixture an agent which binds acids, for example sodium carbonate, sodium acetate, magnesium oxide and pyridine.

Examples of specific esterifying agents are formic acid, acetic acid, propionic acid, α-ethylhexanoic acid, chloroacetic acid, phenylacetic acid, phenoxyacetic acid, acrylic acid, benzoic acid, and the esters, anhydrides or chlorides of these acids, as well as ethyl chloroformate, diketene, methyl isocyanate and phenyl isocyanate.

What has been said regarding the production of dyes containing an acyloxyalkyl radical applies analogously to compounds of formula (I) which contain a carbalkoxyalkyl group in the radical $R^1$. Esterification of the finished dye may be carried out by a method known from the literature, for example acid catalysis in excess alcohol while distilling off the water of reaction. Examples of suitable acid catalysts are p-toluenesulfonic acid and acid ion exchangers. Examples of suitable alcohols are methanol, ethanol, propanol, benzyl alcohol, ethylene glycol, ethylene glycol methyl ether, ethylene glycol phenyl ether, diglycol, triglycol, 1,4-butanediol or 1,6-hexanediol.

Of special importance are dyes of the general formula (Ib):-

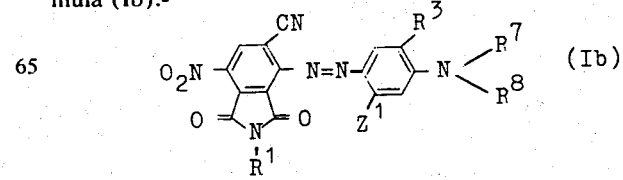

in which

R[1] and R[3] have the meanings given above.
R[7] is methyl, ethyl, β-hydroxyethyl or β-cyanoethyl;
R[8] is methyl, ethyl, hydroxyethyl, hydroxypropyl, cyanoethyl or acetoxyethyl; and
Z[1] is acetylamino or propionylamino.

Preferred radicals R[1] are ω-hydroxyethyl, β-hydroxyethyl, β-hydroxypropyl, γ-hydroxypropyl and the radicals of the formulae $(CH_2)_2-O(CH_2)_2OH$, $(CH_2)_3O(CH_2)_4OH$, $CH_2CHOHC_6H_5$, $(CH_2)_3O(CH_2)_2OC_6H_5$, $(CH_2)_3O(CH_2)_2OC_6H_5$, $C_2H_4OCH_3$, $C_2H_4OC_2H_5$, $C_3H_6OCH_3$, $C_3H_6OC_2H_5$, $C_3H_6OC_3H_7$,

—⟨C⟩—OCH$_2$CH$_2$OH, —⟨H⟩—OH, $CH_3CH_2OCHO$, $CH_2CH_2CH_2OCHO$,
$CH_2CH_2OCOCH_3$, $CH_2CH_2OCOCH_2OC_6H_5$,
$CH_2CH_2CH_2OCOCH_2OC_6H_5$, $CH_2CH_2OCH_2CH_2O$-
CHO, $CH_2CH_2OCH_2CH_2OCOCH_2OC_6H_5$,
$CH_2CH_2OCOCH_2C_6H_5$, $CH_2CH_2OCH_2C$-
$H_2OCOCH_2C_6H_5$, $C_2H_4-C_6H_5$, $CH_2-CH-C_6H_5$,    $CH_3$
  |                  |
  $CH_3$           $CH_2CH_2CH-C_6H_5$ $CH_3$
          |
and    $CH-CH_2CH_2-⟨⟩-OH$.

The new dyes are yellow orange to blue and give red to blue dyeings having good fastness properties, particularly good heat resistance, on textile material of cellulose esters, polyamides and particularly synthetic polyesters such as polyethylene glycol terephthalates.

The invention is further illustrated by the following Examples in which parts and percentages are by weight unless otherwise stated.

PRODUCTION OF THE DIAZO COMPONENTS

EXAMPLE A 12.3 parts of 3-acetylamino-N-isopropylphthalimide (melting point 153° to 154°C) is introduced at -10° to -5°C in the course of thirty minutes into a mixture of 72 parts of concentrated sulfuric acid and 45 parts of 100% nitric acid. The whole is stirred at this temperature for another two hours, poured onto 500 parts of ice, suction filtered and washed until neutral. After drying and recrystallization from ethanol 6.5 parts of 3-acetylamino-6-nitro-N-isopropylphthalimide is obtained having a melting point of 128° to 130°C.

9.3 parts of 3-acetylamino-6-nitro-N-isopropylphthalimide is heated in a mixture of 29.5 parts of concentrated hydrochloric acid and 25 parts of ethanol for fifteen minutes under reflux. The mixture is then poured onto 60 parts of ice, suction filtered, washed until neutral and dried. 7.6 parts of 3-amino-6-nitro-N-isopropylphthalimide is obtained having a melting point of 218° to 220°C.

EXAMPLE B 25 parts of 3-amino-6-nitro-N-isopropylphthalimide is suspended in 500 parts of water, a few drops of a wetting agent are added and bromination is effected at 55°C by slowly dripping in 32 parts of bromine; the whole is stirred at the same temperature for 2 hours. The product is suction filtered, washed with dilute bisulfite solution and water and dried. 31 parts of 3-amino-4-bromo-6-nitro-N-isopropylphthalimide is obtained having a melting point of 248° to 250°C.

EXAMPLE C 12 parts of 3-amino-6-nitro-N-isopropylphthalimide is suspended in 150 parts of glacial acetic acid and chlorinated at 50°C with 1250 parts by volume of chlorine in 30 minutes. After cooling the whole is diluted with 50 parts of water, suction filtered, washed until neutral and dried. 9.6 parts of 3-amino-4-chloro-6-nitro-N-isopropylphthalimide is obtained having a melting point of 242° to 243°C.

EXAMPLE D 15 parts of 3-amino-4-bromo-6-nitro-N-methylphthalimide is heated under reflux in 127 parts of 3-ethoxypropylamine for 2 hours. The amine is then distilled off at 140°C and the residue is recrystallized from a mixture of glacial acetic acid and water. 11 parts of 3-amino-4-bromo-6-nitro-N-(3'-ethoxypropyl)-phthalimide is obtained having a melting point of 159° to 162°C.

The following phthalimide derivatives:

$$R^{10}\underset{O_2N}{\overset{H_2N}{\underset{\phantom{O}}{\bigg|}}}\underset{O}{\overset{O}{\bigg|}}N-R^9$$

in which
R[10] is hydrogen, bromine or chlorine and
R[9] is methyl, ethyl, n-propyl, isopropyl, n-butyl, n-hexyl, cyclohexyl, 3-methoxypropyl, 3-hydroxypropyl, carboethoxymethyl or carboethoxyethyl may also be prepared as described in Examples A to D. The derivatives in which R[10] is alkylsulfonyl or nitro may be obtained by sulfochlorination or nitration.

PRODUCTION OF THE DYES

EXAMPLE 1

12.45 parts of N-isopropyl-3-amino-6 nitrophthalimide (melting point 242° to 243°C) is dissolved at 10° to 15°C in 100 parts of 85% sulfuric acid. The whole is then cooled to 0° to 5°C and diazotization is carried out at this temperature by dripping in 15 parts of nitrosylsulfuric acid containing 12.7% of dinitrogen trioxide. The whole is stirred at 0° to 5°C for another 3 hours and then the diazo solution obtained is allowed to flow slowly into a coupling solution which consists of 10.3 parts of 3-diethylaminoacetanilide, 2 parts of water, 6 parts of 38% hydrochloric acid, 1 part of sulfamic acid, 1000 parts of ice and 800 parts of 20.5% solution of sodium acetate. After stirring for another six hours the dye deposited in crystalline form is suction filtered, washed with water until neutral and dried at 50°C at subatmospheric pressure.

The dye dyes polyester cloth in pink shades exhibiting good fastness to dry-heat pleating and setting.

EXAMPLE 2

14.45 parts of N-cyclohexyl-3-amino-6 nitrophthalimide (melting point 242° to 244°C) is di solved in 100 parts of concentrated sulfuric acid at 10° to 15°C. The whole is then cooled to 0° to 5°C and 30 parts of a mixture of glacial acetic acid and propionic acid in a ratio of 17:3 is dripped in at this temperature. Diazotization is carried out at 0° to 5°C by adding 15 parts of nitrosylsulfuric acid containing 12.7% of dinitrogen trioxide. Stirring is continued for another 3 hours at 0° to 5°C and then the diazo solution obtained is allowed to flow into a coupling solution of 8.95 parts of N-β-hydroxyethyl-N-ethyl-m-toluidine, 25 parts of water, 7 parts of 38% hydrochloric acid, 1 part of sulfamic acid, 500 parts of ice and 500 parts of a 20.5% sodium acetate solution. The dye which is deposited in crystalline form is suction filtered after having been stirred for another 6 hours and is then washed with water until neutral and dried at 50°C at subatmospheric pressure. The dye which is a brown powder dissolves in dimethylformamide to give a red solution and dyes polyester fibers bluish red shades.

Diazo components and coupling components which are reacted as described in Example 2 are given in the following Table: PES = polyester synthetic silk.

| Example No | Diazo component | Coupling component | Shade of dyeing on PES |
|---|---|---|---|
| 3 | 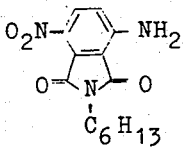 | 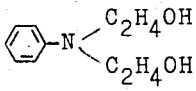 | red |
| 4 | " | 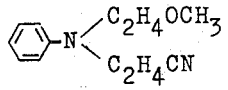 | reddish orange |
| 5 | " | 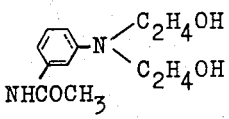 | claret |
| 6 | 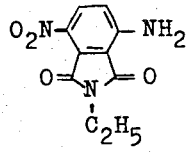 | 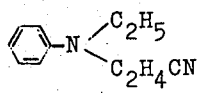 | reddish orange |
| 7 | " | 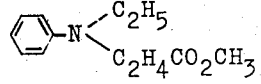 | scarlet |
| 8 | " | 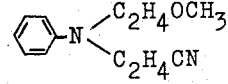 | red |
| 9 | 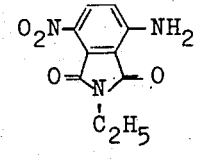 | 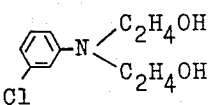 | bluish red |
| 10 | " | 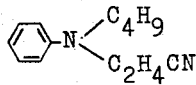 | reddish orange |
| 11 | " | 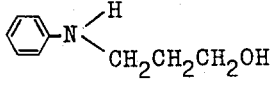 | reddish orange |
| 12 | " | 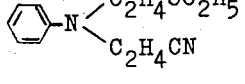 | reddish orange |

EXAMPLE 13

17.1 parts of N-n-butyl-3-amino-4-bromo-6-nitrophthalimide (melting point 175° to 177°C) is dissolved at 10° to 15°C in 100 parts of concentrated sulfuric acid. The whole is cooled to 0° to 5°C and 30 parts of a mixture of glacial acetic acid and propionic acid in a ratio of 17:3 is allowed to flow in at this temperature. Then 15 parts of nitrosylsulfuric acid containing 12.7% of dinitrogen trioxide is dripped in at 0° to 5°C. The whole is stirred for another 3 hours at 0° to 5°C and the diazo solution obtained is allowed to flow slowly into a coupling solution which consists of 26 parts of N-bis-β-hydroxyethyl-m-acetylaminoaniline, 1 part of sulfamic acid, 500 parts of ice and 500 parts of a 20.5% solution of sodium acetate. The dye which has deposited in crystalline form is suction filtered after stirring for a further 6 hours and is washed with water until neutral and dried at 50°C at subatmospheric pressure. The dye (a bluish black powder) dissolves in N-methylpyrrolidone and dyes polyester cloth fast reddish violet shades.

EXAMPLE 14

15 parts of N-methyl-3-amino-4-bromo-6-nitrophthalimide (melting point 243° to 245°C) is dissolved at 10° to 15°C in 100 parts of concentrated sulfuric acid. The whole is cooled to 0° to 5°C and 30 parts of a mixture of glacial acetic acid and propionic acid in a ratio of 17:3 is allowed to flow in at this temperature. Diazotization is then carried out at 0° to 5°C by dripping in 15 parts of nitrosylsulfuric acid containing 12.7% of dinitrogen trioxide. The whole is stirred at 0° to 5°C for another 3 hours and the diazo solution obtained is allowed to flow slowly into a coupling solution of 103 parts of 3-diethylaminoacetanilide, 25 parts of water, 6 parts of 38% hydrochloric acid, 1 part of sulfamic acid and 1000 parts of ice-water. The whole is stirred overnight and the crystalline dye is suction filtered, washed with water until neutral and dried at 50°C under subatmospheric pressure. The bluish black dye powder dyes polyester fibers fast reddish violet shades.

The dyes set out in the following Table are prepared analogously to Example 14:-

| Example | Diazo component | Coupling component | Shade on PES |
|---|---|---|---|
| 15 | $O_2N$—[Br, $NH_2$, phthalimide N-$C_3H_6OH$] | Ph–N($C_2H_4CN$)($C_2H_4OH$) | orange |
| 16 | " | (2-$OCH_3$, 4-$NHCOCH_3$)Ph–N($C_2H_4OH$)($C_2H_4OH$) | violet |
| 17 | " | Ph–N($C_2H_4OH$)($C_2H_4CO_2CH_3$) | orange |
| 18 | " | (3-$CH_3$)Ph–N($C_2H_4CN$)($C_2H_5$) | reddish orange |
| 19 | $O_2N$—[Br, $NH_2$, phthalimide N-$C_3H_6OH$] | (3-$CH_3$)Ph–N($C_2H_5$)($C_3H_6NHCOCH_3$) | red |
| 20 | " | Ph–N($C_2H_4$–Ph)($C_2H_4CN$) | orange |
| 21 | $O_2N$—[$NH_2$, phthalimide N-$C_3H_6OCH_3$] | (3-$CH_3$)Ph–N($C_2H_4OH$)($C_2H_4CN$) | reddish orange |
| 22 | " | (3-Cl)Ph–N($CH_3$)($C_2H_4CO_2CH_3$) | orange |
| 23 | " | Ph–N($CH_3$)($CH_-$) | yellowish orange |

-Continued
| Example | Diazo component | Coupling component | Shade on PES |
|---|---|---|---|
| 24 | " | 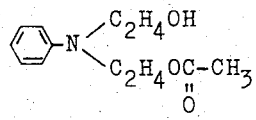 | yellowish orange |
| 25 | " | 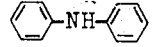 | orange |
| 26 | 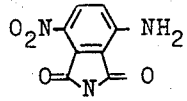 | 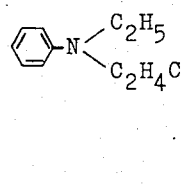 | red |
| 27 | " | 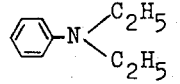 | reddish orange |
| 28 | " | 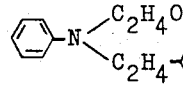 | reddish orange |
| 29 | " | 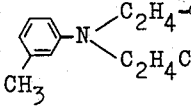 | orange |
| 30 | 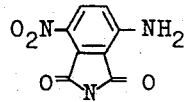 | 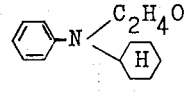 | orange |
| 31 | " | 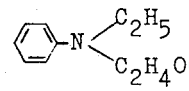 | reddish orange |
| 32 | 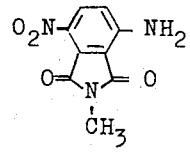 | 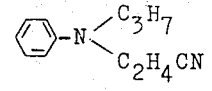 | reddish orange |
| 33 | " | 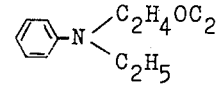 | reddish orange |
| 34 | " | 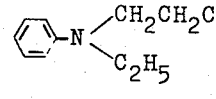 | orange |
| 35 | 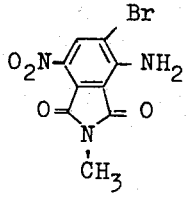 | 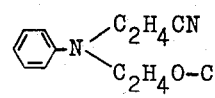 | yellowish orange |

—Continued

| Example | Diazo component | Coupling component | Shade on PES |
|---|---|---|---|
| 36 | " | 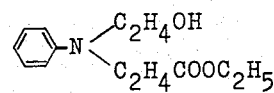 | orange |
| 37 | " | 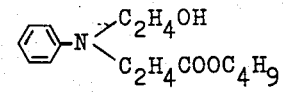 | orange |
| 38 | " | 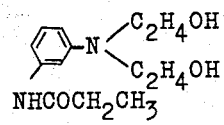 | reddish violet |

EXAMPLE 39

12.7 parts of N-methyl-3-amino-4-chloro-6-nitrophthalimide is dissolved at 10° to 15°C in 100 parts of concentrated sulfuric acid. The whole is then cooled to 0° to 5°C and 30 parts of a mixture of glacial acetic acid and propionic acid in a ratio of 17:3 is allowed to flow in at this temperature. Then 15 parts of nitrosylsulfuric acid containing 12.7% of dinitrogen trioxide is dripped in at 0° to 5°C. The whole is stirred for another three hours at 0° to 5°C and the diazo solution obtained is allowed to flow into a coupling solution which consists of 8.95 parts of N-methoxyethyl-N-ethylaniline, 25 parts of water, 8 parts of 38% hydrochloric acid, 1 part of sulfamic acid, 500 parts of ice and 500 parts of a 20.5% solution of sodium acetate. The whole is stirred for another 6 hours and the crystalline dye is suction filtered, washed with water until neutral and dried at 50°C at subatmospheric pressure. A brown powder is obtained which gives fast orange dyeings on polyester cloth.

EXAMPLE 40

14.2 parts of N-isopropyl-3-amino-4-chloro-6-nitrophthalimide is dissolved at 10° to 15°C in 100 parts of concentrated sulfuric acid. The whole is cooled to 0° to 5°C and at this temperature 30 parts of a mixture of glacial acetic acid and propionic acid in a ratio of 17:3 is allowed to flow in. Diazotization is then carried out at 0° to 5°C by dripping in 15 parts of nitrosylsulfuric acid containing 12.7% of dinitrogen trioxide. The diazo solution thus obtained is allowed to flow slowly into a coupling solution of 8.25 parts of N-ethyl-N-β-hydroxyethylaniline, 25 parts of water, 6 parts of 38% hydrochloric acid, 1 part of sulfamic acid, 500 parts of ice and 500 parts of a 20.5% solution of sodium acetate. The dye which is deposited in crystalline form is stirred for another 6 hours and then suction filtered, washed with water until neutral and dried at 50°C at subatmospheric pressure. A brownish orange powder is obtained which dissolves in dimethylformamide and dyes polyester cloth reddish orange shades.

| Example | Diazo component | Coupling component | Shade on PES |
|---|---|---|---|
| 41 | 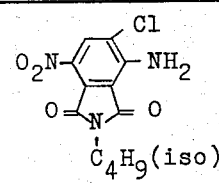 | 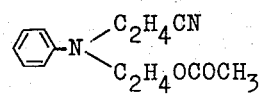 | yellowish orange |
| 42 | " | 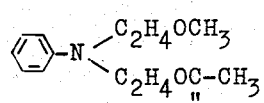 | yellowish orange |
| 43 | " | 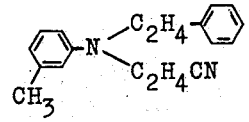 | orange |
| 44 | 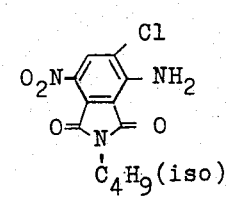 | 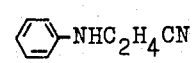 | reddish yellow |

—Continued

| Example | Diazo component | Coupling component | Shade on PES |
|---|---|---|---|
| 45 | " | ⟨⟩-NHC₂H₄OH | yellowish orange |
| 46 | O₂N–[Cl, NH₂, phthalimide N-C₃H₇] | ⟨⟩-NHC₂H₅ | yellowish orange |
| 47 | " | OCH₃, NHCOCH₃ substituted phenyl-N(C₂H₄CN)(C₂H₄OH) | violet |
| 48 | " | 3-CH₃-phenyl-N(C₂H₅)₂ | red |
| 49 | " | phenyl-N(C₂H₄OCH₃)(C₂H₄CO₂CH₃) | yellowish orange |

EXAMPLE 50

11.0 parts of the coupling product N-methyl-3-amino-4-bromo-6-nitrophthalimide → N,N-bis-β-hydroxyethyl-m-acetylaminoaniline is dissolved in 100 parts of dimethylformamide. 2.1 parts of copper(I) cyanide is added to this solution in the course of fifteen minutes. The mixture is then heated to 80° to 90°C and stirred at this temperature for 2 hours. The replacement of bromine by cyanogen may be followed chromatographically. After the reaction is over, 20 parts of 20% ammonia and 20 parts of water are added to chelate the copper salt, the whole is stirred for another 30 minutes and the dye is suction filtered. The dye is then washed with water until neutral and dried at subatmospheric pressure at 60°C. A bluish black powder is obtained which dyes polyester cloth brilliant blue shades exhibiting high fastness to light and dry-heat pleating and setting.

EXAMPLE 51

10.3 parts of the coupling product N-methyl-3-amino-4-bromo-6-nitrophthalimide → 3-diethylaminoacetoanilide is dissolved in 100 parts of dimethylformamide. 2.1 parts of copper(I) cyanide is introduced into this solution in the course of 10 minutes at room temperature. Then the whole is heated to 60° to 70°C and stirred at this temperature for 2 hours until chromatography shows that the reaction is over. 20 parts of 20% ammonia and 80 parts of water are then added, the whole is stirred for 30 minutes and the dye is suction filtered. The dye is then washed with water until neutral and dried at 60°C at subatmospheric pressure. A dark powder is obtained which dyes polyester cloth in fast navy blue shades.

The dyes in the following Table are prepared analogously to Example 51:-

| Example | Dye | Shade on PES |
|---|---|---|
| 52 | O₂N–[CN, phthalimide N-C₂H₅]–N=N–⟨⟩(OCH₃)(NHCOCH₃)–N(C₂H₄OH)₂ | greenish blue |
| 53 | " –N=N–⟨⟩(CH₃)–N(C₂H₅)(C₂H₄OH) | bluish violet |

—Continued

| Example | Dye | Shade on PES |
|---|---|---|
| 54 | $O_2N$—[ring with CN, $N=N$—phenyl—$N(C_2H_5)(C_2H_5)$, NHCOCH$_3$, phthalimide N—$C_3H_7$] | blue |
| 55 | " —$N=N$—phenyl(OCH$_3$, NHCOCH$_3$)—$N(C_2H_4CN)(C_2H_4OH)$ | greenish blue |
| 56 | $O_2N$—[ring with CN, $N=N$—phenyl—$N(C_2H_4OH)(C_2H_4OH)$, NHCOCH$_3$, phthalimide N—$C_3H_6OH$] | blue |
| 57 | " —$N=N$—phenyl—$N(C_2H_5)(C_2H_4OH)$ | bluish violet |
| 58 | " —$N=N$—phenyl(CH$_3$)—$N(C_2H_4OH)(C_2H_4OH)$ | reddish blue |
| 59 | $O_2N$—[ring with CN, $N=N$—phenyl(CH$_3$)—$N(C_2H_5)(C_3H_6NHCOCH_3)$, phthalimide N—cyclohexyl] | blue |
| 60 | " —$N=N$—phenyl—$N(C_2H_5)(C_2H_4OCH_3)$ | violet |

EXAMPLE 61

14.7 parts of N-propyl-3-amino-4,6-dinitrophthalimide is dissolved at 10° to 15°C in 100 parts of concentrated sulfuric acid. The whole is cooled to 0° to 5°C and at this temperature 30 parts of a mixture of glacial acetic acid and propionic acid in a ratio of 17:3 is allowed to flow in. 15 parts of nitrosylsulfuric acid having a content of dinitrogen trioxide of 12.7% is then dripped in at 0° to 5°C. The whole is stirred for another 3 hours at 0° to 5°C and the diazo solution obtained is allowed to flow slowly into a coupling solution consisting of 26 parts of N-bis-β-hydroxyethyl-m-acetylaminoaniline, 1 part of sulfamic acid, 500 parts of ice and 500 parts of a 20.5% solution of sodium acetate. The dye which is deposited in crystalline form is stirred for another 6 hours and then suction filtered, washed with water until neutral and dried at 50°C at subatmospheric pressure. The dye dissolves in N-methylpyrrolidone and dyes polyester cloth blue shades.

EXAMPLE 62

18.35 parts of N-cyclohexyl-3-amino-4-methylsulfonyl-6-nitrophthalimide is dissolved in 100 parts of concentrated sulfuric acid at 10° to 15°C. The whole is cooled to 0° to 5°C and at this temperature 30 parts of a mixture of glacial acetic acid and propionic acid in a ratio of 17:3 is allowed to flow in. 15 parts of nitrosylsulfuric acid containing 12.7% of dinitrogen trioxide is dripped in at 0° to 5°C. The whole is stirred for another 3 hours at 0° to 5°C and the diazo solution obtained is allowed to flow slowly into a coupling solution consisting of 26 parts of N-bis-β-hydroxyethyl-m-acetylaminoaniline, 1 part of sulfamic acid, 500 parts of ice and 500 parts of a 20.5% solution of sodium acetate. After stirring for another six hours the dye which is deposited in crystalline form is suction filtered, washed with water until neutral and dried at 50°C at subatmospheric pressure. The dye dyes polyester cloth reddish blue shades.

EXAMPLE 63

14.4 parts of the dye of the formula:-

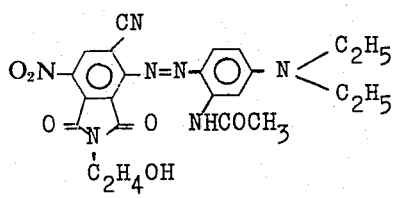

250 parts by volume of chlorobenzene, 15.2 parts of phenoxyacetic acid and 0.5 part of p-toluenesulfonic acid are heated under reflux for two hours. To complete esterification, 200 parts by volume of chlorobenzene is distilled off with the water of reaction over a period of 5 hours. The product is isolated by adding 500 parts by volume of methanol to the residue; the precipitated dye of the formula:-

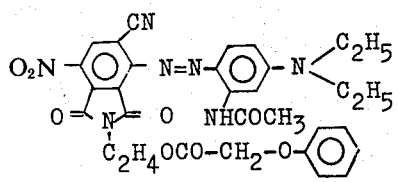

is suction filtered and washed with methanol. The dark powder obtained after drying produces fast blue shades on polyester cloth.

There are obtained by methods analogous to those described in the Examples dyes characterized by R¹ in the following Table and having the formula:-

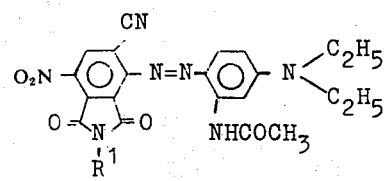

| Example | $R^1$ |
|---|---|
| 64 | $-CH_2-CH_2-OCHO$ |
| 65 | $-(CH_2)_3-O-CHO$ |
| 66 | $-(CH_2)_2-OCOCH_3$ |
| 67 | $-(CH_2)_3-O-CO-CH_2-C_6H_5$ |
| 68 | $-(CH_2)_2-O-(CH_2)_2-OCHO$ |
| 69 | $-(CH_2)_2-O-(CH_2)_2O-CO-CH_2-O-C_6H_5$ |
| 70 | $-(CH_2)_2O(CH_2)_2OCOCH_2C_6H_5$ |
| 71 | $-(CH_2)_2O(CH_2)_2OH$ |
| 72 | $-(CH_2)_3O(CH_2)_4OH$ |
| 73 | $-CH_2-CH(OH)-C_6H_5$ |
| 74 | $-(CH_2)_3O(CH_2)_2OC_6H_5$ |
| 75 | $-(CH_2)_2OCH_3$ |
| 76 | $-(CH_2)_2OC_2H_5$ |
| 77 | $-(CH_2)_3-OCH_3$ |
| 78 | $-(CH_2)_3-OC_2H_5$ |
| 79 | $-(CH_2)_3OC_3H_7$ |
| 80 | —⟨O⟩— $O(CH_2)_2OH$ |
| 81 | —⟨H⟩— OH |

All these dyes give blue dyeings on polyester cloth, or having the formula:-

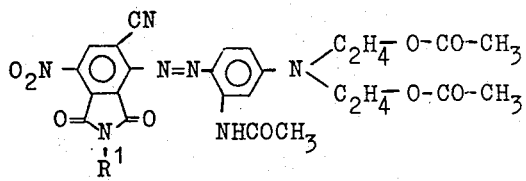

| Example | $R^1$ |
|---|---|
| 82 | —⟨O⟩— $O(CH_2)_2OH$ |
| 83 | $-(CH_2)_3OC_3H_7$ |
| 84 | —⟨H⟩— OH |
| 85 | $-(CH_2)_3OC_2H_5$ |
| 86 | $-(CH_2)_3OCH_3$ |
| 87 | $-(CH_2)_2OC_2H_5$ |
| 88 | $-(CH_2)_2OCH_3$ |
| 89 | $-(CH_2)_3O(CH_2)_2OC_6H_5$ |
| 90 | $-CH_2-CH(OH)-C_6H_5$ |
| 91 | $-(CH_2)_3O(CH_2)_4OH$ |
| 92 | $-(CH_2)_2O(CH_2)_2OH$ |
| 93 | $-(CH_2)_2O(CH_2)_2OCOCH_2C_6H_5$ |
| 94 | $-(CH_2)_2O(CH_2)_2OCOCH_2OC_6H_5$ |
| 95 | $-(CH_2)_2O(CH_2)_2OCHO$ |
| 96 | $-(CH_2)_3OCOCH_2C_6H_5$ |
| 97 | $-(CH_2)_2OCOCH_3$ |
| 98 | $-(CH_2)_3OCHO$ |
| 99 | $-(CH_2)_2OCHO$ |
| 100 | $-(CH_2)_2COCH_2C_6H_5$ |
| 101 | $-\overset{CH_3}{\underset{}{CH}}-CH_2-CH_2-⟨O⟩-$ OH |

All these dyes give blue dyeings on polyester cloth.

We claim:
1. A dye of the formula:

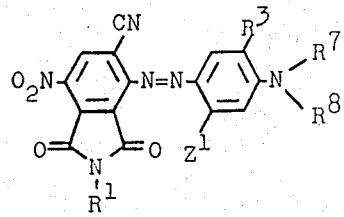

in which
R[1] is alkyl of 1 to 4 carbon atoms, cyclohexyl or alkoxyalkyl of a total of 3 to 7 carbon atoms;
R[3] is hydrogen, methoxy or ethoxy;
R[7] is methyl, ethyl, β-hydroxyethyl or β-cyanoethyl;
R[x] is methyl, ethyl, hydroxyethyl, hydroxypropyl cyanoethyl or acetoxyethyl; and
Z[1] is acetylamino or propionylamino.

* * * * *